(12) United States Patent
Safir et al.

(10) Patent No.: US 12,106,609 B2
(45) Date of Patent: Oct. 1, 2024

(54) MALICIOUS CONNECTIVITY INTERRUPTION DETECTION

(71) Applicant: FORD GLOBAL TECHNOLOGIES, LLC, Dearborn, MI (US)

(72) Inventors: Tarik Safir, London (GB); Sam Harris, Billericay (GB); James Nicholas Murray, Chelmsford (GB); Hasan Akoglu, Brentwood (GB); Gabriel Mitchell, London (GB); Aaron Abentheuer, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 472 days.

(21) Appl. No.: 17/666,117

(22) Filed: Feb. 7, 2022

(65) Prior Publication Data

US 2023/0252826 A1 Aug. 10, 2023

(51) Int. Cl.
*G07C 5/00* (2006.01)
*H04W 4/40* (2018.01)
*H04W 72/29* (2023.01)
*H04W 76/18* (2018.01)
*H04W 76/19* (2018.01)

(52) U.S. Cl.
CPC .............. *G07C 5/008* (2013.01); *H04W 4/40* (2018.02); *H04W 72/29* (2023.01); *H04W 76/18* (2018.02); *H04W 76/19* (2018.02)

(58) Field of Classification Search
CPC ....... G07C 5/008; G07C 5/0816; H04W 4/40; H04W 72/29; H04W 76/18; H04W 76/19; H04W 76/30; H04W 24/08; G08B 21/24
See application file for complete search history.

(56) References Cited

U.S. PATENT DOCUMENTS

| 8,159,336 B2 | 4/2012 | Snider et al. |
| 9,102,293 B2 | 8/2015 | Babholkar et al. |
| 2011/0148609 A1* | 6/2011 | Dabholkar .............. B60R 25/10 340/426.1 |
| 2011/0151795 A1* | 6/2011 | D'Avello ................ H04K 3/825 455/63.3 |
| 2011/0151827 A1* | 6/2011 | Snider ..................... B60R 25/00 455/404.1 |
| 2020/0213287 A1 | 7/2020 | Zhang et al. |

FOREIGN PATENT DOCUMENTS

CN 106548635 B 7/2019

* cited by examiner

*Primary Examiner* — Omeed Alizada
(74) *Attorney, Agent, or Firm* — Joseph Zane; Brooks Kushman P.C

(57) ABSTRACT

A system receives vehicle state data reported over a connection established with a vehicle and determines a loss of connection with the vehicle. Responsive to the loss of connection, the system performs an analysis of a plurality of predefined causes of incidental connection loss, based on vehicle state data previously reported compared to predefined values indicative of causing a lost connection. Responsive to the analysis indicating no predefined cause of incidental connection loss being present, the system triggers a vehicle alarm state protocol.

16 Claims, 2 Drawing Sheets

MALICIOUS CONNECTIVITY INTERRUPTION DETECTION

TECHNICAL FIELD

The illustrative embodiments generally relate to detection of malicious interruption of connectivity.

BACKGROUND

Traditional vehicle security systems rely on loud alarms and flashing lights to alert bystanders of attempted intrusion. These systems have the limitation of requiring an interested bystander to be with earshot or eyeshot, and also rely on someone who may not be an owner of the vehicle to take action to preserve the vehicle. Further, with many false positives of such alarms caused for a variety of reasons, many people have become somewhat immune to the sound of a vehicle alarm.

More modern systems rely on wireless connectivity, such as an integrated modem connected to the cloud. Those systems can alert both a monitoring service and a vehicle owner, of any alarm trigger, which has the advantage of relaying the triggering to parties which have a vested interest in vehicle protection, even if neither of those parties is on-site. The downside to these systems is that they can be interrupted by signal jamming, service interruption and disabling power to the systems. Some of these conditions can be caused incidentally, others may be due to someone with malicious intent attempting to thwart the alarm. While these systems may also have an on-site alarm, once connectivity is interrupted, they effectively function as deterrence in a manner similar to the older systems, relying on bystanders to take action or a loud noise to scare away a potential intruder.

SUMMARY

In a first illustrative embodiment, a system includes one or more processors configured to receive vehicle state data reported over a connection established with a vehicle and determine a loss of connection with the vehicle. The one or more processors are further configured to, responsive to the loss of connection, perform an analysis of a plurality of predefined causes of incidental connection loss, based on vehicle state data previously reported compared to predefined values indicative of causing a lost connection, and, responsive to the analysis indicating no predefined cause of incidental connection loss being present, trigger a vehicle alarm state protocol.

In a second illustrative embodiment, a method includes receiving vehicle state data reported over a connection established with a vehicle. The method further includes determining a loss of connection with the vehicle and, responsive to the loss of connection, performing an analysis of a plurality of predefined causes of incidental connection loss, based on vehicle state data previously reported compared to predefined values indicative of causing a lost connection. Additionally, the method includes, responsive to the analysis indicating no predefined cause of incidental connection loss being present, triggering a vehicle alarm state protocol.

In a third illustrative embodiment, a system includes one or more processors configured to receive vehicle state data reported over a connection established with a vehicle. The one or more processors are also configured to determine a loss of connection with the vehicle and attempt one or more new connections with the vehicle, responsive to the loss of connection, the new connections utilizing a different connection medium than that used for the connection that was lost and for other of the attempted one or more new connections. Further, the one or more processors are configured to, responsive to the loss of connection and none of the one or more new connections being successful, perform an analysis of a plurality of predefined causes of incidental connection loss, based on vehicle state data previously reported compared to predefined values indicative of causing a lost connection. Additionally, the one or more processors are configured to, responsive to the analysis indicating no predefined cause of incidental connection loss being present, trigger a vehicle alarm state protocol, and, responsive to the analysis indicating at least one predefined cause of incidental connection loss, report an incidental connection loss, including reporting any vehicle state data indicative of the cause of incidental connection loss.

DETAILED DESCRIPTION

Figure 1:
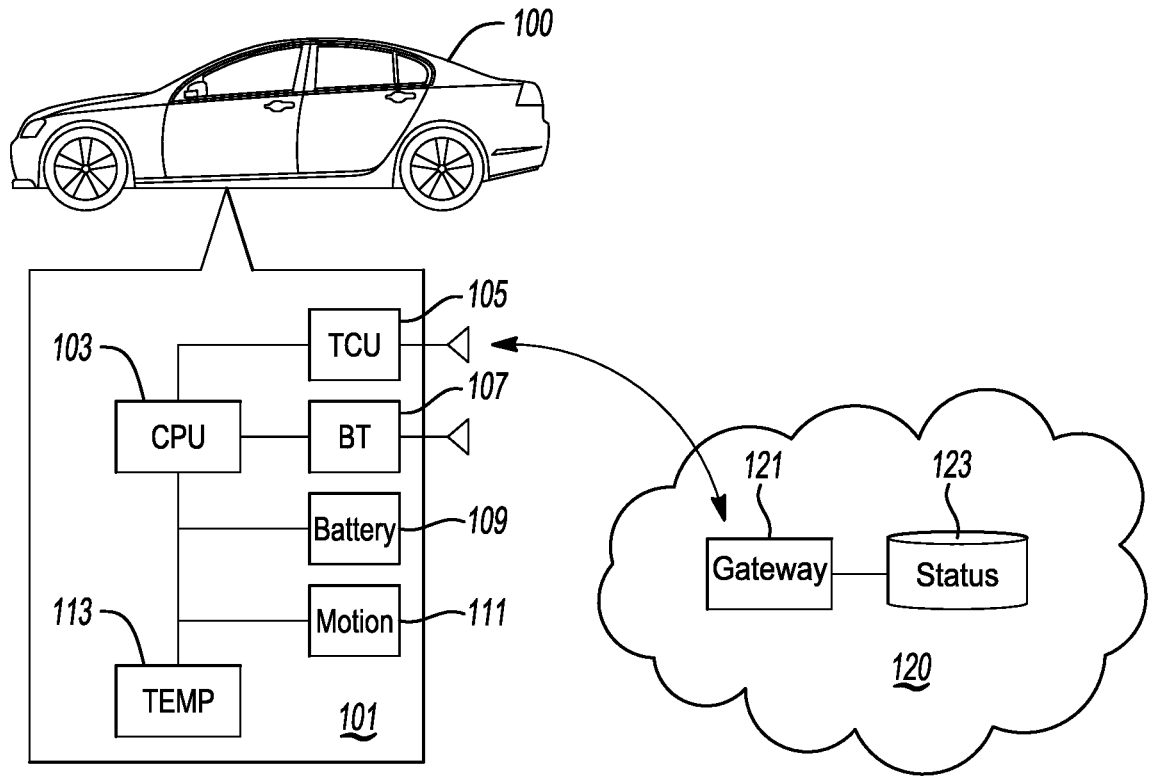
FIG. 1 shows an illustrative example of a vehicle and cloud reporting system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other, and whether described as a processor or one or more processors, it is appreciated that either paradigm is contemplated, and those processors executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

As previously noted, modern alarm solutions leverage connectivity to the cloud to notify interested parties when an alarm state is triggered, which puts the notification of the alarm at the fingertips of the correctly motivated parties. If a vehicle is parked underground, for example, or in a region with poor cellular coverage, such systems may not be highly effective, and yet their usage persists because despite limitations imposed by connectivity constraints, they remain an effective form of theft deterrence and mitigation. At the same time, owners and monitoring companies are aware that connectivity may be naturally lost, from time to time, and thus the temporary loss of connectivity is an accepted constraint on the usage of these systems.

Recognizing this, persons of malicious intent can attempt to block signals or even disable power to onboard modems, rendering the connectivity non-functional. Monitoring services or owners may view such an event as an expected occasionally connectivity loss, as opposed to a malicious action, and since the condition itself could indicate either occurrence (natural or intentional connectivity loss), it can be difficult to ensure that the loss is due to an attack, as opposed to simply an occurrence of an occasional event.

If connectivity is lost due to an attack, however, the only remote indication of the attack even having occurred may be the fact of connectivity loss itself. That is, the vehicle, once connectivity is lost, cannot send signals or alerts to a remote party, and so the simple loss of connectivity is the only signal that will be sent. Because this could occur for natural reasons, the loss of connectivity alone is not a great single-point indicator of an attack. On the other hand, because the loss could occur due to an attack, the loss of signal provides an opportunity, in the illustrative embodiments, for greater analysis of conditions leading up to the loss, and presents an opportunity to determine if the loss should have been expected for natural reasons or if the loss was completely unexpectable and therefore may be indicative of an attack on the vehicle.

Vehicle alarm systems may maintain continual or repeated, periodic connectivity with a cloud, depending on power preservation states and a particular configuration. For example, one system may keep an always-on connection, only interrupted when connectivity itself is lost (e.g., underground, remote locations, etc.). Other systems may periodically check-in, such as every X seconds, and the frequency of check-in can even be tuned to a vehicle location (higher frequency in higher-risk areas).

In either system, connectivity loss can be detected when a vehicle either loses an always-on connection or when a vehicle fails to check-in. At this point, the remote server may only know that connectivity has been lost, but may not have a specific reason why connectivity has been lost. The server may, however, track some vehicle state information that is usable to determine reasons why connectivity may have been lost, i.e., whether the dropped connection was likely malicious or natural. This remote information can include, for example, data usable to determine if the battery is likely out of charge, poor signal strength occurred, the device software failed, the device hardware failed, the vehicle was likely moving at some speed at the time of loss (making a theft event unlikely), etc. By diagnosing or at least predicting the sources of connectivity loss, or at least a subset of the sources, the remote server can make a determination as to whether further alarm action should be taken. The server could also still alert an owner or monitoring service as well, but at least additional information could be provided so that police or owners are not falsely dispatched if there is a very low or no likelihood of the connectivity loss being due to malicious action. When the determination is that the loss is due to malice, then appropriate security action can be taken.

FIG. 1 shows an illustrative example of a vehicle and cloud reporting system. The vehicle 100 includes an onboard computing system 101, which can include an amalgamation of multiple onboard computing systems and is merely representative of a subset of technology that can be included with the vehicle 100.

The system 101 includes one or more processors 103, and can include connectivity solutions such as one or more modems and/or telematics control units (TCUs) 105 and one or more BLUETOOTH connections 107. One or more vehicle busses can provide connection from the processors to the connectivity solutions and to, for example, onboard sensors and information sources such as, but not limited, to, battery state analysis 109, motion sensors (e.g., accelerometers) 111 and/or temperature sensors 113. Some information can also be determined from, for example, changes in GPS coordinates over time, local temperatures according to a weather map, etc.

Additional information about vehicle states can include, but is not limited to, current signal strengths detected by vehicle modem(s), known areas of low signal or signal loss cross referenced with vehicle known locations or projected locations, vehicle movement determined by changes in GPS coordinates over time, etc. Thus, even a vehicle lacking in one or more particular sensors may be able to effectively report (or a server may be able to effectively determine)

parameters relevant to a determination as to the cause of a given connectivity loss event. This information can be conveyed to the cloud 120 through a gateway process 121, which can communicate with a plurality of vehicles and be used in conjunction with other cloud or backend processes to sort and store state and status information in a vehicle database 123.

For example, a vehicle in a standby (parked) state may periodically report certain information deemed relevant and likely to change over time, such as temperature, battery charge, signal strength, etc. Information such as GPS coordinates may only be reported once, until a vehicle movement event (startup, accelerometer change, tilt detection, etc.) occurs, as the GPS is unlikely to change while the vehicle is parked. This information could, of course, be reported at each interval, but if there is an interest in limiting data transmission, certain information can be reported more frequently when the vehicle is under certain states as opposed others.

The cloud may also occasionally request updated information if a data set is growing stale, or if certain vehicle information is indicative of a potential signal loss and there is a desire to gather additional information to more accurately diagnose the cause of a signal loss. Vehicles can report information at virtually any time, and, for example, when parked in a known garage location at a home, for example, or other relatively secure location, may even elect to slow reporting frequency to maximize battery life and minimize data transfer. On the other hand, since a vehicle could even be stolen from a garage, vehicles (or owners or monitoring services) may elect to have reporting continue. Frequency of reporting can also vary as a function of an area (higher crime=higher reporting) or a time of day, day of week, or time of year, based on statistics indicative of when theft and break-in is likely to occur. For example, holidays may be a time of increased break-in due to the nature of things likely in the vehicle, and so reporting frequency can increase around those times, or after dark (which itself can vary), or after certain hours of the night, etc.

Figure 2:
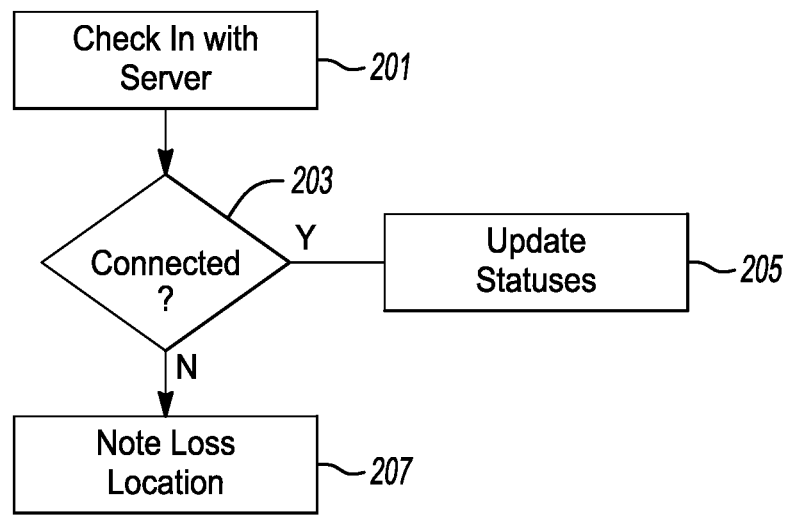
FIG. 2 shows an illustrative vehicle state reporting process.

FIG. 2 shows an illustrative vehicle state reporting process. This is a process that may be much more complex as described above, and which may itself vary based on factors assigned to a given implementation or embodiment. In general, the vehicle 100 may establish or always-have a connection to the cloud server and check-in at 201 at periodic intervals. Even if the connection is always on, data may still be reported in intervals in order to avoid the overhead associated with a near-continual flow of data, however, the frequency or consistency of reporting is contemplated to be whatever is deemed necessary for the system to provide adequate analysis of connectivity loss in light of the cost of data transmission, for example. This can even vary by insurance provider, monitoring service, class of vehicle, etc., and the frequency of reporting can be set by a customer, monitoring service, original equipment manufacturer (OEM), etc.

If a vehicle 100 attempts to check-in with a server at 201 and notes that there is no available connection, the vehicle 100 may internally note a location where services were unavailable. If the connection was lost due to a malicious attack, the server may be able to recognize this through a process such as that described in FIG. 3. At the same time, the connection could be lost for any number of legitimate onboard reasons, a common one of which would include no cellular signal at a given location. Accordingly, the vehicle 100 can note the location at 207 or any other pertinent data.

Pertinent data includes data that might be useful in later analysis, for example, such as data that can be warehoused at the server to confirm that signal loss is expected under certain conditions (e.g., without limitation, at certain locations, under certain vehicle-detectable weather conditions, etc.). The vehicle may be incapable of detecting aggressive weather, but could note time of day and location, for example, and the server may later (upon receipt of the data) conclude that the vehicle was in the middle of a snowstorm at that given location at that time of day, and therefore this could be an excusable reason to lose connectivity. Then, for example, if another vehicle reported coordinates that were proximate to a snowstorm just before losing connectivity, the server may have a contemplated justifiable reason, other than malice, if the other vehicle suddenly loses connectivity.

In this manner, by tracking conditions related to spots where connectivity is lost, the vehicle can assist the server in becoming more accurate about predicting when a communication interruption is malicious, and help avoid false dispatches of emergency personnel. If the connection is available at 203, the vehicle 100 can update all of its relevant statuses at 205. This can include, for example, current signal strength, battery state(s), exterior temperatures, etc. The vehicle could additionally report any information that had been gathered at prior points where check-in was unavailable, so that the server could obtain the updated data about reasonable lost connections on a regular basis.

Figure 3:
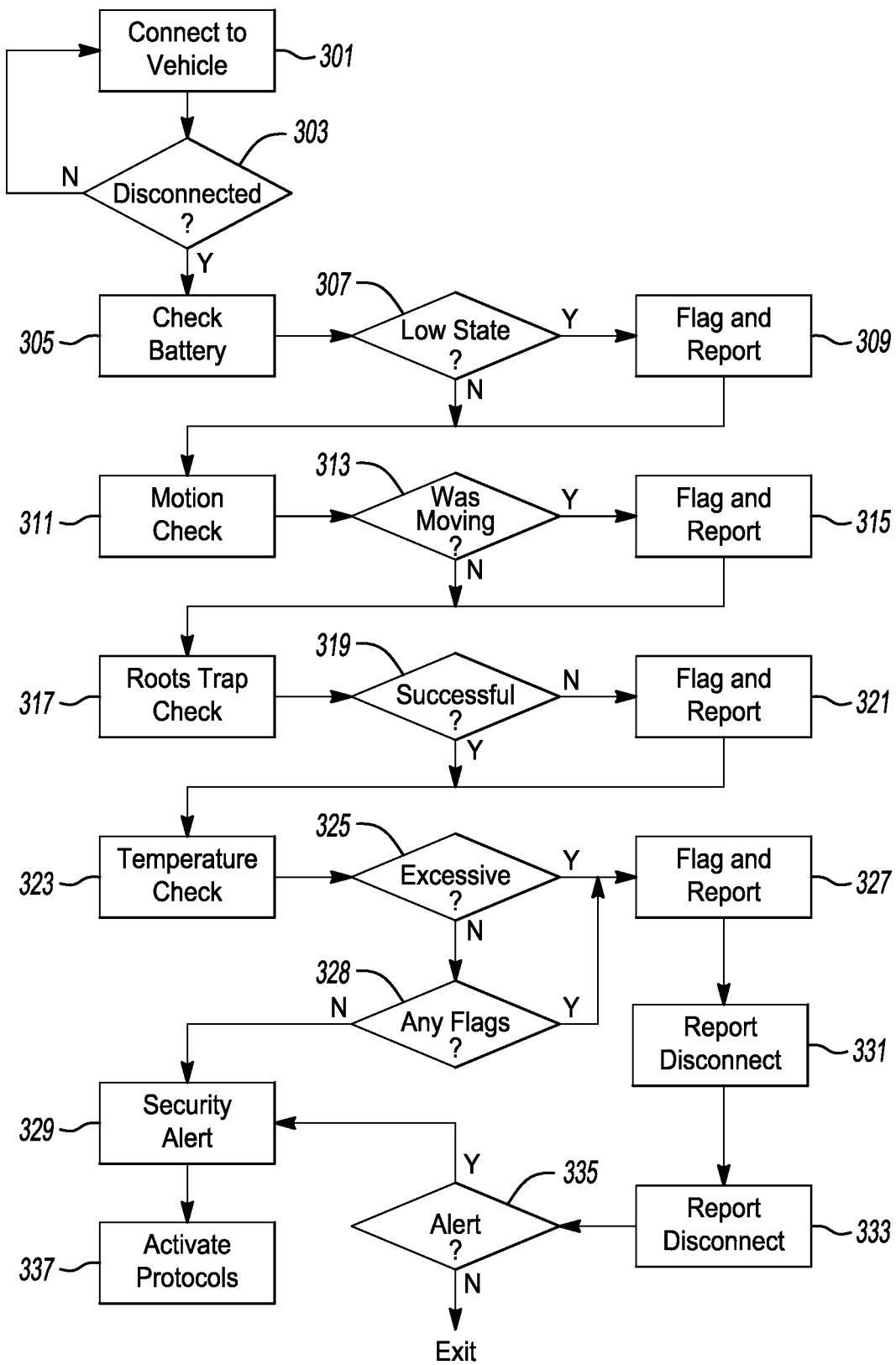
FIG. 3 shows an illustrative analysis and prediction process.

FIG. 3 shows an illustrative analysis and prediction process. In this example, the server attempts to connect to the vehicle 100 at 301 and determines if a connection can be established at 303. As previously noted, the vehicle may have a "mostly on" or "always on" connection to the server as well, and so an attempt to connect to the vehicle 100 at 301 could simply start at the determination of whether the connection still existed at 303. Or, in another example, the connection could be lost and the server could attempt an explicit connection in response to the lost connection, just to ensure that a connection cannot be established at 303. Further, if the vehicle has multiple modems or other connection options (e.g., wi-fi connectivity), the server could try one or more alternative options.

For example, if there was loss of one carrier's signal and the vehicle 100 had two modems, each of which used a different carrier, the server may attempt to connect using the alternative modem. If an attacker had blocked wireless signals or disabled modem power in some manner, then no connectivity may be available and so the failure on multiple connection fronts may itself be an indicator of potential malicious intent. The server could also attempt to connect to one or more phones that are paired with the vehicle 100, to see if a connection (and occupant presence) could be verified through communication through the phone. That is, the server connects to the phone and attempts BLUETOOTH communication or wi-fi communication with the vehicle 100. Again, the general attempt is to determine if the connection loss was incidental or malicious, and so these connection attempts are all possible indicators of one or the other.

Further, even if the vehicle 100 is under attack, one of the connection attempts may succeed because the attacker did not disable that medium, and then onboard alarm signals and other alerts could be relayed to the server, rendering the onboard alert systems operable to relay information again. If any connection is established and an alarm state exists and is conveyed to the server, the server can take appropriate action. If a connection is established and an alarm state is not conveyed, the server may be able to use the established connection to better diagnose the reason for loss of connection on the channel(s) that is/are no longer functional.

If no connection can be established at 303, the server checks a reported battery state at 305. While a number of checks are presented as indicators of incidental connection loss, these are merely illustrative in nature and do not limit the scope of consideration thereto. Any reasonable diagnosis for an incidental connection loss can be used, and an alarm can be triggered following any reasonable number of varied diagnoses—i.e., there may be more or fewer checks than presented. Also, there may be a preferred order for the checks based on a given situation or environment, and the order presented is merely illustrative.

If the battery was previously reported in a low state, determined at 307, the server may note this at 309 and proceed to another check at 311. The vehicle 100 may periodically report battery states and the server can log these states for the vehicle 100, so at any point in time the server may have a reasonably accurate notion of the battery state. Even if the battery state is low, that may or may not cause the server to forego the remainder of the checks. For example, if the battery state is so low that it would be highly likely the cause, the server may assume that the battery was the cause of the lost connection, and stop with the additional checks. On the other hand, either from an abundance of caution or because the battery state was not excessively low, but was still somewhat low, for example, the server may continue with the other checks.

At 311 the server checks if the vehicle was recently in motion. If the last reporting signal had the vehicle moving at 60 mph and occurred five seconds earlier, it is highly unlikely that the vehicle has stopped, become unoccupied, and subsequently become attacked, all within 5 seconds. On the other hand, if the vehicle was last reported as moving at 5 mph and the last report was 3 minutes earlier, it is possible the vehicle was attacked soon after parking, when an occupant had walked away. If the vehicle 100 was recently moving at 313, the server can flag this as an indicator of incidental signal loss at 315, as well as contemplating a time of last reporting of the movement. Again, whether the process stops here and concludes that the signal loss was incidental or continues can be a matter of design choice. For example, in the 60 mph and 5 seconds-prior-reporting example above, it may be reasonable enough to assume that the connection loss was incidental to justify no additional checks at that moment.

While not shown as a separate detection, vehicle GPS coordinates plus motion could also tend to indicate the vehicle was headed into an area known for low or lost signals (remote areas, urban areas, parking garages, etc.). If a motion profile of the vehicle 100 tends to indicate that the vehicle 100 is likely in an area of lost signal, that can also be a possible flag as a reason for why the connection was lost/unavailable.

As can be seen from the diagram, the server progresses through a series of checks, wherein if a given condition, indicative of incidental signal loss, is not present, the server can check additional conditions, until a list of checks has been exhausted or until a high likelihood of attack is determined. Similarly, even if conditions are present, the server may continue the checks, or may cease the checks if the particulars of a given condition render it above a threshold likelihood that the signal loss was incidental.

The server may also determine if the system on chip (SoC) was able to bootstrap with the cloud after a warm or cold boot at 317. If prior observed/reported data (in sufficient temporal proximity to the immediate moment) indicates that there was a successful bootstrap at 319, then the system assumes that the connection loss was not due to a software or hardware malfunction. If there was no reported bootstrap or if the last reported bootstrap was too long ago in the past, the server may flag the connection loss as possibly related to a software/hardware issue at 321.

The server further checks the temperature at the vehicle at 323. High vehicle temperatures (environmental, operating, etc.) can cause temporary shutdown of certain vehicle systems to avoid damaging the system. The vehicle 100 may report a number of temperatures (operating temperatures in various zones, exterior temperatures, etc.). The server may further use a last-known vehicle GPS location to check a weather map and determine a current local temperature in the area of the vehicle 100. If any related temperature is above a threshold for that temperature at 325, the vehicle may flag this as a possible cause of connection loss. For example, operating temperatures may have certain thresholds based on what electronics are proximate to zones (e.g., cabin, engine compartment, cargo space, etc.) and exterior temperature may additionally have a threshold. Again, since some temperatures are not directly dispositive on the question of whether hardware was intentionally shut down to protect the hardware, the likelihood of temperature as a root cause may be considered based on the information available and modeling—e.g., if the threshold for exterior temperature is 110 degrees Fahrenheit-111 degrees may be a likely indicator, 125 degrees may be a highly likely indicator and either may be flagged at 327.

Once the server has completed any determinations as shown in the examples, if all factors related to incidental disconnection are negative at 328 (e.g., there are no flags), then the server determines a high likelihood of attack and issues a security alert at 329, which can include activating security protocols at 337 (e.g., reporting to authorities, triggering any detection/tracking protocols, triggering any disabling protocols, etc.).

If flags have been set at 328, then at least one state exists that could have been the temporary cause of connection loss. In this example, the server will report (e.g., to an owner, a monitoring service, a PSAP operator, etc.) the connection loss at 331 and report any issues that were flagged at 333.

If the report is issued to an owner, the owner may check the vehicle explicitly and determine if the vehicle is under attack. If the owner observes an attack, the owner can explicitly issue an alert back to the server, through a phone, for example, to trigger protocols. If the report is issued to a monitoring service, that service can alert an owner and/or make a determination about the likelihood of attack vs. incidental loss. The monitoring service may also be able to, for example, use local infrastructure to check in on the vehicle based on where the vehicle is expected to be (e.g., if the service can use a local camera with a view of a lot where the vehicle is expected to be located). PSAP operators can make similar determinations and may have better access to infrastructure elements, and can check in on the vehicle and/or issue an alert if the conditions so warrant.

If any entity to which a report was made issues an alert at 335, the server can take appropriate measures at 329. Otherwise, the loss will be contemplated as incidental and the server can continue to attempt to check in with the vehicle 100 until connection is re-established. Even if initial connection loss was determined to be incidental, the server may still run some or all checks at periodic intervals until connection is re-established or an alert is issued.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
receive vehicle state data reported over a connection established with a vehicle;
determine a loss of connection with the vehicle;
attempt one or more new connections with the vehicle, responsive to the loss of connection, the new connections utilizing a different connection medium than that used for the connection that was lost and for other of the attempted one or more new connections;
responsive to the new connection being successful, delay an analysis, of a plurality of predefined causes of incidental connection loss, based on vehicle state data previously reported compared to predefined values indicative of causing a lost connection, until the new connection is lost;
responsive to the loss of connection, perform the analysis, including accommodation of the delay, when the new connection was successful, by delaying the analysis until the new connection is lost;
responsive to the analysis indicating no predefined cause of incidental connection loss being present, trigger a vehicle alarm state protocol; and
responsive to the analysis indicating at least one predefined cause of incidental connection loss, report an incidental connection loss, including reporting any vehicle state data indicative of the cause of incidental connection loss.

2. The system of claim 1, wherein the loss of connection includes at least one of disruption of an ongoing connection or failure upon an attempt to connect to the vehicle.

3. The system of claim 1, wherein the predefined causes include vehicle battery state compared to a predefined battery state indicative of insufficient power to maintain or establish a connection from a vehicle side.

4. The system of claim 1, wherein the predefined causes include a vehicle motion state comparted to predefined parameters indicating that the vehicle is unlikely to have stopped.

5. The system of claim 4, wherein the motion state includes vehicle speed and a last-reported time when the motion state was reported and wherein the predefined parameters include respective speeds and durations for comparison, the speeds and durations collectively indicating that the vehicle is unlikely to have stopped.

6. The system of claim 1, wherein the predefined causes include a vehicle location compared to predefined parameters indicating locations where signal loss is known to occur based on observed historical data.

7. The system of claim 1, wherein the predefined causes include system on chip bootstrap status compared to predefined parameters indicating likely software or hardware failure.

8. The system of claim 1, wherein the predefined parameters include at least one vehicle temperature state compared to predefined parameters indicating shutdown temperatures for a vehicle system necessary for the connection.

9. The system of claim 8, wherein the vehicle temperature state includes at least one of temperature of a vehicle interior or exterior temperature at the vehicle.

10. The system of claim 1, wherein the one or more processors are further configured to: report the incidental connection loss to at least one of a designated vehicle owner, a security monitoring service or a public safety access point.

11. A method comprising:
receiving vehicle state data reported over a connection established with a vehicle;
determining a loss of connection with the vehicle;
attempting one or more new connections with the vehicle, responsive to the loss of connection, the new connections utilizing a different connection medium than that used for the connection that was lost and for other of the attempted one or more new connections;
responsive to the new connection being successful, delay an analysis, of a plurality of predefined causes of incidental connection loss, based on vehicle state data previously reported compared to predefined values indicative of causing a lost connection, until the new connection is lost;
responsive to the loss of connection, perform the analysis, including accommodating of the delay, when the new connection was successful, by delaying the analysis until the new connection is lost;
responsive to the analysis indicating no predefined cause of incidental connection loss being present, trigger a vehicle alarm state protocol; and
responsive to the analysis indicating at least one predefined cause of incidental connection loss, report an incidental connection loss, including reporting any vehicle state data indicative of the cause of incidental connection loss.

12. The method of claim 11, wherein the predefined causes include vehicle battery state compared to a predefined battery state indicative of insufficient power to maintain or establish a connection from a vehicle side.

13. The method of claim 11, wherein the predefined causes include a vehicle motion state comparted to predefined parameters indicating that the vehicle is unlikely to have stopped.

14. The method of claim 11, wherein the predefined causes include a vehicle location compared to predefined parameters indicating locations where signal loss is known to occur based on observed historical data.

15. The method of claim 11, wherein the predefined causes include system on chip bootstrap status compared to predefined parameters indicating likely software or hardware failure.

16. The method of claim 11, wherein the predefined parameters include at least one vehicle temperature state compared to predefined parameters indicating shutdown temperatures for a vehicle system necessary for the connection.

* * * * *